(12) United States Patent
Measom

(10) Patent No.: US 6,427,582 B1
(45) Date of Patent: Aug. 6, 2002

(54) CONVECTION COOKING SYSTEM FOR ROASTING POULTRY

(75) Inventor: Ty Measom, Logan, UT (US)

(73) Assignee: Dutro Company, Emeryville, CA (US)

( * ) Notice: Subject to any disclaimer, the term of this patent is extended or adjusted under 35 U.S.C. 154(b) by 0 days.

(21) Appl. No.: 10/055,084

(22) Filed: Jan. 25, 2002

(51) Int. Cl.$^7$ .......................... A47J 37/00; A47J 37/04; A47J 37/07

(52) U.S. Cl. ................ 99/342; 99/345; 99/419; 99/446; 99/450; 99/426

(58) Field of Search .................... 99/339, 340, 342, 99/345–347, 403, 419–421 V, 426, 427, 444–450, 481, 482; 126/25 R, 9 R, 41 R

(56) References Cited

U.S. PATENT DOCUMENTS

| | | | |
|---|---|---|---|
| 3,583,307 A | * 6/1971 | Lee, Sr. ................... 99/446 X |
| 4,420,493 A | * 12/1983 | Greck ...................... 99/419 X |
| 4,450,759 A | * 5/1984 | Steibel ..................... 99/426 X |
| 4,903,683 A | 2/1990 | Larsen et al. |
| 5,067,396 A | 11/1991 | Sorensen et al. |
| 5,301,602 A | * 4/1994 | Ryczek ..................... 99/345 |
| 5,431,092 A | * 7/1995 | Guillory .................... 99/410 |
| 5,575,198 A | * 11/1996 | Lowery ..................... 99/426 |
| 5,586,489 A | * 12/1996 | Fraga ....................... 99/421 H |
| 5,662,028 A | * 9/1997 | Fraga ....................... 99/448 |
| 5,758,569 A | 6/1998 | Barbour |
| 5,893,320 A | * 4/1999 | Demaree .................... 99/419 |
| 5,896,810 A | 4/1999 | Barbour |
| 6,119,585 A | * 9/2000 | Guidry ...................... 99/345 |
| 6,125,739 A | * 10/2000 | Jernigan .................... 99/345 |
| D437,522 S | 2/2001 | Measom |
| 6,192,792 B1 | * 2/2001 | Gremillion .................. 99/426 |
| 6,293,271 B1 | * 9/2001 | Barbour ..................... 126/25 R |

\* cited by examiner

Primary Examiner—Timothy F. Simone
(74) Attorney, Agent, or Firm—Harris Zimmerman, Esq.

(57) ABSTRACT

A cooking container adapted for roasting large fowl has a pot shaped base member and a top member shaped like an inverted pot that jointly form a high heating chamber proportioned to receive a full sized fowl in a vertical orientation, A heat pipe extends upward from an opening in the bottom of the base member and enters the hollow interior of the dressed fowl. A trivet in the heating chamber holds the fowl out of contact with the very hot bottom of the base member. Relative rotation of the base member and top member opens a notch into which a meat thermometer may be entered. The roaster configuration facilitates outdoor cooking where available heat sources, such as gas cookers, barbecue stands or campfires, concentrate heating at the base of an overlying food container.

10 Claims, 3 Drawing Sheets

CONVECTION COOKING SYSTEM FOR ROASTING POULTRY

BACKGROUND OF THE INVENTION

This invention relates to cookware and more particularly to roasters in which poultry, such as turkeys for example, are cooked.

Turkeys or the like which are to be roasted in a home oven are typically placed in a large lidded pan known as a turkey roaster. The roaster catches drippings from the cooking meat, inhibits release of volatile greases into the external environment, retains moisture in the meat and brings about a more optimal distribution of heat to different areas of the turkey or the like.

Turkey roasters designed for indoor oven use are not well suited for outdoor cooking where the available heat source is a gas cooker, barbecue stand or campfire for example. Compared with an indoor oven, such heat sources apply relatively intense heat to a limited area of the base of a roaster and reduced heat elsewhere. The conventional indoor roaster is proportioned to enable a horizontal orientation of the turkey. These factors can result in an uneven and undesirably slow cooking of the turkey if the indoor roaster is placed over a typical outdoor heat source of one of the above described kinds.

Conventional cooking of a turkey or other large fowl including in indoor ovens typically requires several hours. This prolonged cooking time can be a considerable inconvenience.

The present invention is directed to overcoming one or more of the problems discussed above.

BRIEF SUMMARY OF THE INVENTION

In one aspect the present invention provides a convection heating system particularly adapted for containing a large fowl during roasting of the fowl. The system includes a pot shaped base member and a top member having an inverted pot shape and being disposable on top of the base member. The base member and top member jointly form a high heating chamber proportioned to receive and enclose a dressed full sized fowl which is in a vertical orientation. The bottom of the base member has an opening at a substantially centered location in the base member. A tubular heat pipe extends upward from the opening and is proportioned for fitting into the interior cavity of the dressed fowl, A trivet member supports the fowl in the heating chamber while holding the fowl out of contact with the bottom of the base member. The trivet member has a centered opening which enables the heat pipe to extend upward through the trivet member and into the overlaying upright fowl.

In another aspect the invention provides a food container particularly adapted for containing a large fowl during roasting of the fowl. Components include a circular pot shaped base member which is of increasing diameter in the upward direction, the base member having an open rim at the top and having a bottom with a substantially centered opening therein. A tubular heat pipe extends upward from the opening within the base member. Additional components include a circular top member having the shape of an inverted pot and which rests on said rim of said base member, the top member being of progressively decreasing diameter in the upward direction. The top member and base member jointly form a heating chamber proportioned to receive a dressed full sized fowl which is in a vertical orientation with the heat pipe extending up into the interior of the fowl. An annular trivet plate encircles the heat pipe within the base member and has airflow openings which extend through the plate. Legs extend down from the trivet plate to support the plate at a location which is upwardly spaced from the bottom of the base member.

The invention effects a highly efficient and faster convection heating of a roasting turkey or the like particularly where the roaster which contains the turkey is placed over a concentrated heat source as in outdoor cooking. The heating chamber is proportioned to hold the roasting turkey in a vertical orientation. The height of the heating chamber enhances convection heating. Heat is applied directly to the interior cavity of the dressed fowl through a heat pipe which extends upward from the base of the roaster.

The invention, together with further objects and advantages thereof, may be further understood by reference to the following detailed description of the preferred embodiment of the invention and by reference to the accompanying drawings.

DETAILED DESCRIPTION OF THE INVENTION

Figure 1:
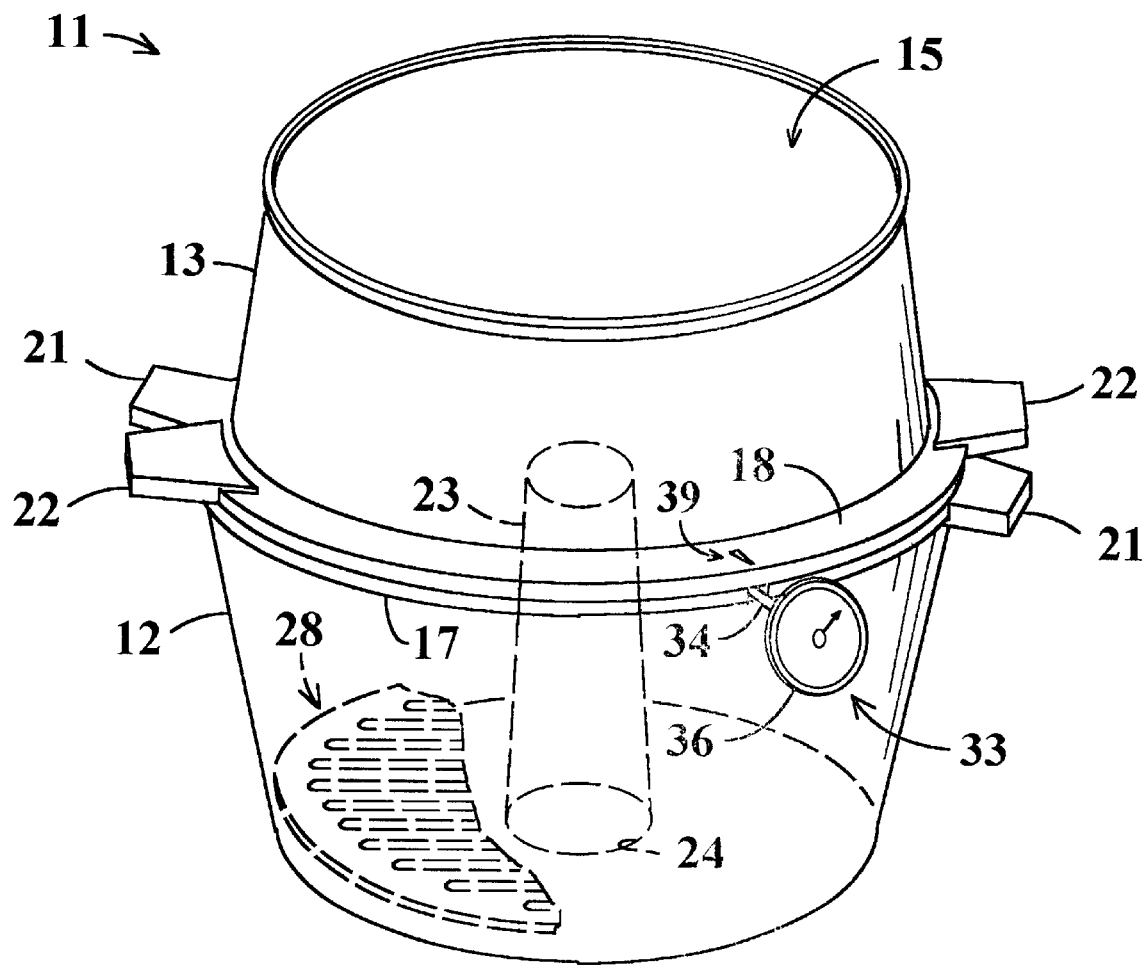
FIG. 1 is a perspective view of a convection heating system or turkey roaster in accordance with the preferred embodiment of the invention.
Figure 2:
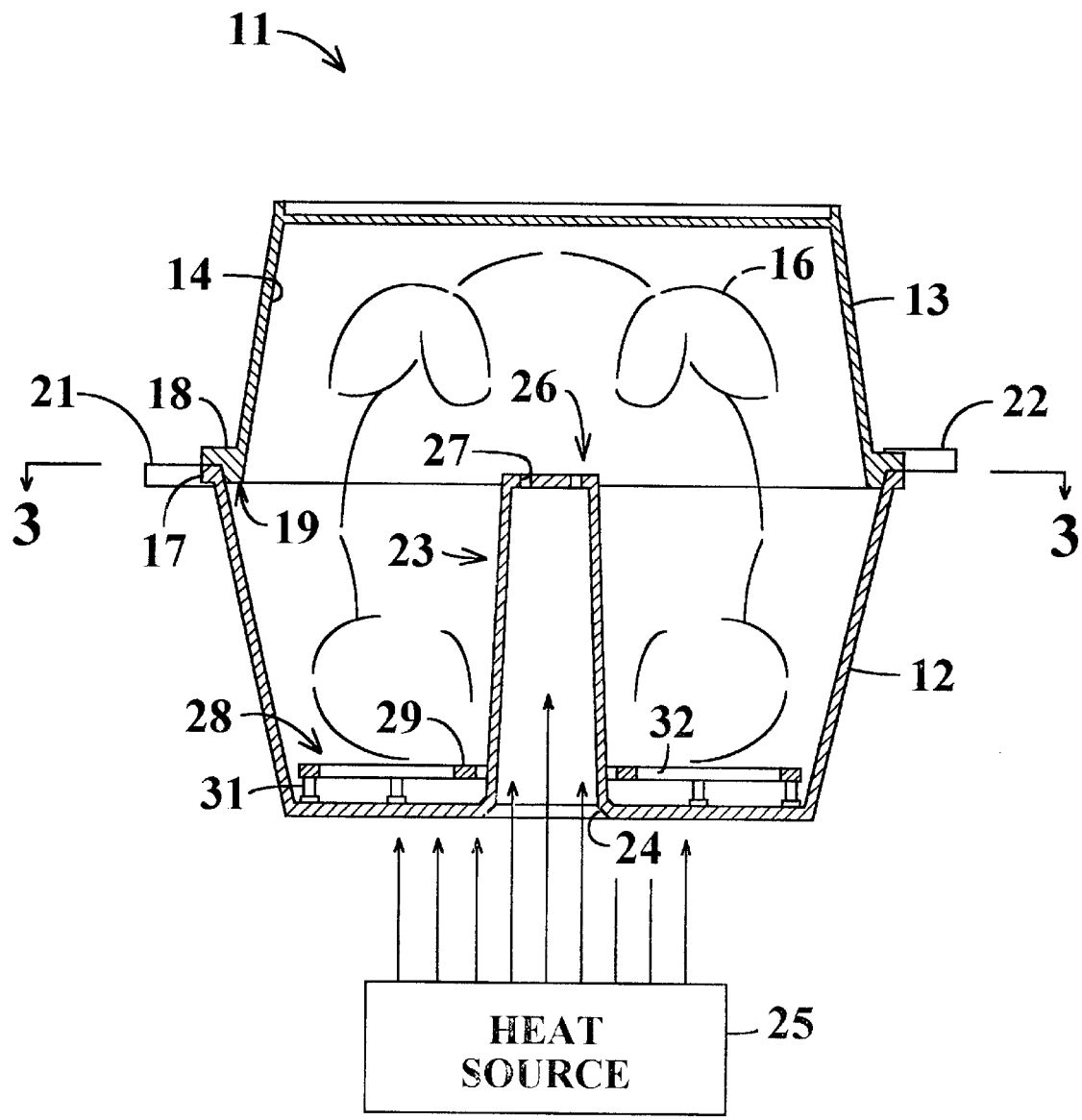
FIG. 2 is an elevation section view of the turkey roaster of FIG. 1

Referring jointly to FIGS. 1 and 2 of the drawings, a convection heating system or turkey roaster 11 in accordance with the preferred embodiment of the invention has a pot shaped base member 12 and a top member 13 having the shape of an inverted pot and which seats on the base member during use. Base member 12 and top member 13 are jointly proportioned to provide a large convection heating chamber 14 of sufficient vertical extent to receive and contain a full sized dressed turkey 16 in an upright orientation. The term "vertical orientation" as used herein means that the head of the turkey, if it were still present, would be uppermost and the tail of the turkey, if it were still present, would be lowermost.

Heating of the turkey 16 is largely by a convection process. Air heated at the relatively hot base of the heating chamber 14 rises around the exposed surfaces of the turkey 16. The upward flowing air looses heat to the external environment at the upper region of heating chamber 14 by conduction through the wall of top member 13 and also transfers heat to the turkey itself. This results in a slight cooling of the air then which sinks to the bottom of the chamber 24, receives more heat and recirculates to the top of the chamber. The vertically elongated configuration of heating chamber 14 enhances this convection induced circulation of heated air resulting in a faster and more uniform application of heat to the turkey 16.

The base member 12 has a height which exceeds one half of the full height of heating chamber 14 and turkey 16 but which is substantially less than the full height of the chamber. Top member 13 is proportioned to be a flat topped dome which provides a sizable portion of the heating chamber 14.

In particular, top member 13 has a height which is more than half the height of base member 12. This proportioning of the base member 12 assures retention of the turkey 12 when the top member 13 is lifted while also facilitating placement of the turkey 16 in the heating chamber 14 and removal of the cooked turkey from the chamber. The configuration also facilitates inspection of the turkey during the roasting process.

Base member 12 preferably has a frusto-conical shape and top member 13 has an inverted frusto-conical shape. This minimizes the bulk and weight of the roaster 11 while conforming the heating chamber 14 to the shape of the upright turkey 14. The top surface 15 of top member 13 is preferably flat and unobstructed by handles or other protuberances. This facilitates optional use of the top member 13 as an ordinary cooking pot for purposes other than roasting a fowl.

Figure 3:
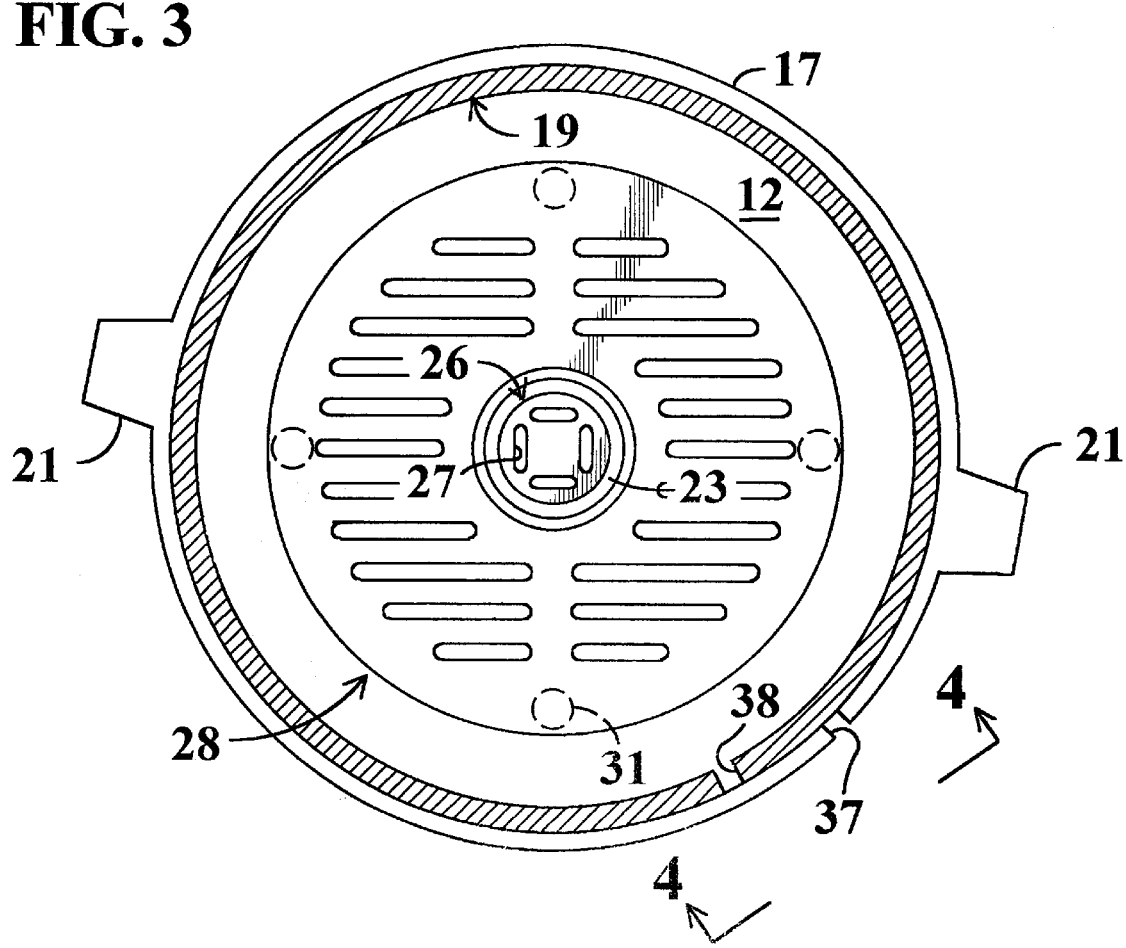
FIG. 3 is a cross section view taken along line 3—3 of FIG. 2 and depicting the bottom portion of the turkey roaster of the preceding figures.

Referring jointly to FIGS. 1, 2 and 3, the top of base member 12 is an outward extending first flange 17. A second outward extending flange 18 at the bottom of top member 13 seats on the base member flange 17. A short annular extension 19 at the bottom of top member 13 extends a small distance down into the base member 12, adjacent to flange 17, to inhibit lateral movement of the top member relative to the base member.

Lifting of the base member 12 and lifting of the roaster 11 as a whole is facilitated by a first pair of lug handles 21 which extend outward from first flange 17 at opposite locations on the base member. A second similarly configured pair of lug handles 22 extend outward from opposite locations on the top member flange 18 to enable independent lifting and carrying of the top member 13. The top member 13 may be rotated relative to base member 12 to bring the top member handles 22 into an overlaying relationship with the base member handle 21 to enable simultaneous grasping of both sets of handles when the roaster 11 as a whole is to be lifted. Turning of the top member 13 to bring the top member handles 22 out of the overlaying relationship enables lifting the top member independently of the base member 12.

The roaster 11 provides for faster cooking of the turkey 16 and for a more uniform cooking by a direct application of additional heat to the hollow interior cavity of the dressed turkey. For this purpose, a tubular heat pipe 23 extends upward from a centered opening 24 in the bottom of base member 24 preferably to the top of the base member. A partial closure 26 at the top of the heat pipe has slots 27 which enable convection induced heat flow to enter and leave heating chamber 14 through the heat pipe 23. Heat is also transmitted to the central region of the base member 12 by conduction through the wall of the heat pipe 23. The heat pipe 24 is preferably conical and of diminishing diameter in the upward direction to facilitate insertion into the turkey 16.

In a typical usage the roaster 11 is placed over a source 25 of concentrated heat such as an outdoor gas cooker, barbecue, campfire or the burner of an indoor stove. These heat sources 25 tend to heat the bottom of the base member 12 to very high temperatures. Direct contact of the turkey 14 with the bottom of base member 12 could result in overcooking of that part of the turkey. The turkey 14 is supported and held out of contact with the bottom of base member 12 by a trivet 28. Trivet 28 has an annular plate 29 which encircles heat pipe 23 and on which the turkey 14 rests. Short legs 31 extend down from plate 29 to support the plate at a location which is spaced apart from the bottom of base member 12 by a small distance. Parallel slots 32 in plate 29 enable the convection induced heat flow to pass through the trivet 28.

Figure 4:
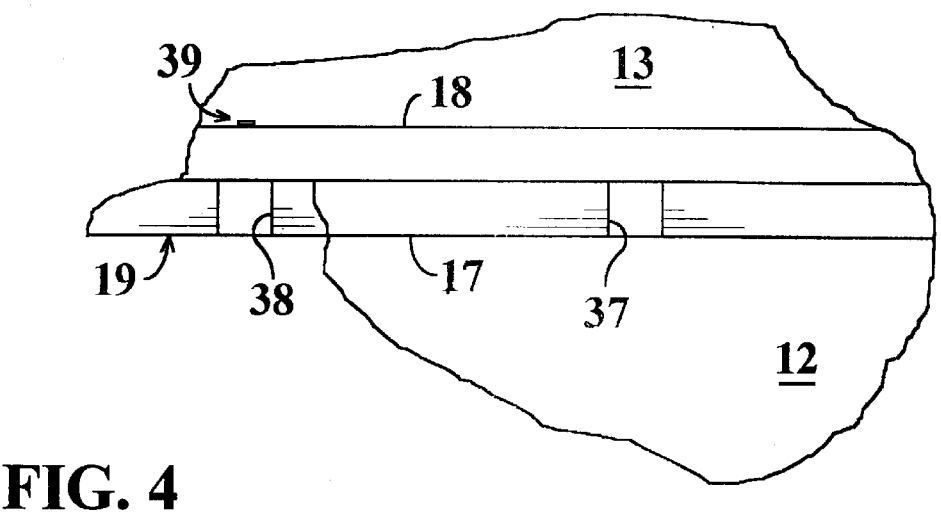
FIG. 4 is a side view of a portion of the turkey roaster taken along line 4—4 of FIG. 3.

Referring now to FIGS. 1 and 4, a meat thermometer 33 can be helpful during roasting of a turkey or the like. A typical meat thermometer of one of the known types has a stem 34 which is inserted into the turkey and a dial 36 at which meat temperature is indicated. Use of thermometer 33 is facilitated by a first notch 37 which extends through the base member flange 17 and a second notch 38 which extends through the top member flange 18. Top member 13 can be rotated relative to base member 12 to bring notches 37 and 38 into alignment with other. This enables insertion of the thermometer stem 34 into the roasting turkey, without opening the roaster 11, while the temperature indicating dial 36 of the thermometer remains visible outside of the roaster. Top member 13 can also be rotated to take the notches 37 and 38 out of alignment when the thermometer is not in use and it is desired to prevent escape of heated air through the notches. Positioning of the top member 13 for insertion of the thermometer is facilitated by a marking 39 on flange 18 which is directly above notch 38.

Many modifications and variations are possible and it is not intended to limit the invention except as defined by the following claims.

What is claimed is:

1. A convection heating system particularly adapted for containing a large fowl during roasting of the fowl comprising:

a pot shaped base member and a top member having an inverted pot shape and being disposable on top of the base member, said base member and top member jointly forming a high convection heating chamber proportioned to receive and enclose a dressed full sized large fowl in a vertical orientation, said base member having a bottom with an opening therethrough at a substantially centered location in the base member and having a tubular heat pipe extending upward from said opening within said heating chamber and being proportioned for fitting into the interior cavity of the dressed fowl, and a trivet member proportioned for supporting said fowl in said heating chamber while holding said fowl out of contact with said bottom of said base member, said trivet member having a centered opening which enables said heat pipe to extend upward through said trivet member and into the overlaying fowl.

2. The convection heating system of claim 1 wherein said base member has a height which exceeds one half of the height of said heating chamber and wherein said top member forms a dome having a height at least equal to half of the height of said base member.

3. The convection heating system of claim 1 wherein said heat pipe has a height which is at least equal to one half of the height of said heating chamber.

4. The convection heating system of claim 1 wherein said base member is of frusto-conical shape and of progressively increasing diameter in the upward direction and wherein said top member is of inverted frusto-conical shape and of progressively increasing diameter in the downward direction.

5. The convection heating system of claim 1 wherein said top member has a top surface which is flat and free of protuberances.

6. The convection heating system of claim 1 wherein said trivet includes an annular plate encircling said heat pipe and having a plurality of airflow passages, the trivet further having a plurality of supporting legs extending downward from said plate to the bottom of said base member.

7. The convection heating system of claim 1 wherein said base member has an upper rim formed by a first annular flange and said top member has a second annular flange which seats on said rim of said base member, said top member having an annular portion which extends downward into said base member in overlapping relationship with said rim of said base member.

8. The convection heating system of claim 7 wherein each of said flanges have notches which may be brought into alignment by turning of said top member to open a passage for insertion of a thermometer into said heating chamber.

9. The convection heating system of claim 7 wherein said base member has a first pair of sideward extending lug handles situated at opposite sides of said first flange, said top member having a second pair of similar lug handles situated at opposite sides of said second flange, said top member being turnable relative to said base member to cause said second pair of lug handles to overlay and cover said first pair of lug handles to facilitate joint lifting of the base member and top member and being turnable to separate said first and second pairs of lug handles to facilitate lifting of said top member from said base member.

10. A food container particularly adapted for containing a large fowl during roasting of the fowl comprising:

a circular pot shaped base member which is of increasing diameter in the upward direction, said base member having an open rim at the top and having a bottom with a substantially centered opening therein, said base member further having a tubular heat pipe which extends upward from said opening within the base member, a circular top member having the shape of an inverted pot and which rests on said rim of said base member, said top member being of progressively decreasing diameter in the upward direction, said top member and base member jointly forming a heating chamber proportioned to receive a dressed full sized fowl in an upright orientation with said heat pipe extending into the interior of said fowl, and an annular trivet plate encircling said heat pipe within said base member and having airflow openings which extend through the plate, said trivet plate having legs which support the plate at a location which is upwardly spaced from the bottom of the base member.

* * * * *